United States Patent [19]
Koide et al.

[11] 3,736,504
[45] May 29, 1973

[54] BROADBAND SPECTRAL INTENSITY MEASUREMENT SYSTEM

[75] Inventors: Frank K. Koide, Fullerton; Frederick R. Hume, Brea, both of Calif.

[73] Assignee: North American Rockwell Corporation, El Segundo, Calif.

[22] Filed: Mar. 16, 1970

[21] Appl. No.: 19,578

[52] U.S. Cl. ................. 324/74, 324/57 PS, 324/102
[51] Int. Cl. ........................ G01r 19/04, G01r 19/26
[58] Field of Search ....................... 324/57 PS, 57 N, 324/130, 57 A, 103 P

[56] References Cited

UNITED STATES PATENTS

| | | | |
|---|---|---|---|
| 2,883,616 | 4/1959 | Sabaroff | 324/57 R |
| 2,989,700 | 6/1961 | Most | 324/130 X |

OTHER PUBLICATIONS

Wylie, Jr.; C. R. "Advanced Engineering Mathematics" McGraw–Hill, 1951, pp. 138–139.
Cuccia; C. L., "Harmonics, Sidebands & Transients in Communication Engineering," McGraw–Hill, 1952, pp. 319–322.
Assadourian; F., "Characteristics of Microwave Signals," Handbook of Microwave Measurements 3rd Edition Vol. III, Polytechnic Press of Polytechnic Inst. of Brooklyn, 1963, pp. 945–951, 963, 964–966.
Sabaroff; S., "Impulse Excitation of a Cascade of Series Tuned Circuit," Pro. IRE 12–1944 pp. 758–760.
Andrews, R. B., Jr., "An Impulse Spectral Intensity Measurement System," IEEE Trans. on Inst. & Measurement VIM–IS, No. 4, 12–1966, pp. 299–303.
Geselowitz, D. B. "Response of Ideal Radio Noise Meter to Continuous Sine Wave, Recurrent Impulses, & Random Noise," IRE Trans. on Radio Frequency Interference 5–1961, pp. 2–11.
Everitt et al., "Communication Engineering" McGraw–Hill 1956, pp. 58–62.
Solomon, C., "Spectrum Analysis," Handbck. of Microwave Measurements, Polytechnic Inst. of Brooklyn, 1956, 2nd Edition Vol. 1, pp. 9–1; 9–3.

Primary Examiner—Rudolph V. Rolinec
Assistant Examiner—Wm. H. Punter
Attorney—L. Lee Humphries and H. Fredrick Hamann

[57] ABSTRACT

The invention is directed to a method and system for calibrating impulse generators and the like; a system consisting of a receiver which is tunable to a group of individual calibration frequencies and which is connectable to an impulse generator under calibration so as to provide an indication of the signal level from the impulse generator at each of the calibration frequencies. In addition, a CW signal source tunable to the same group of individual calibration frequencies has its output fed to a modulation means, which modulation means can modulate the CW signal source with either a pulse signal or with a constant level signal having a level identical to the peak level of the pulse signal and wherein means are provided for measuring the particular level of the CW signal at each of the individual calibrating frequencies after the pulsed signal is fed to the receiver and its amplitude adjusted so that the receiver provides an indication which is identical for the signal received from the impulse generator and from the pulse modulated CW signal source. The following formula is then used to compute the spectral intensity of the impulse generator:

$$S = E_{rms}\tau_0$$

Where:
S is the spectral intensity in rms volts per Hertz
E is the *rms* voltage level of the CW signal
$\tau_0$ is the pulse width of the pulse signal used to modulate the CW signal.

The above formula applies in a general case by definition. However, in a particular case when using a thin film thermoelectric or thermistor mount power measuring device, the spectral intensity of the impulse generator is determined by:

$$S = \left[\sqrt{\frac{P|Z|}{\cos\theta}} \cdot \tau_0\right]$$

Where:
P is the power level of the CW si signal
$|Z|$ is the absolute impedance of the power measuring device
$\theta$ is the phase angle between the resistive component and the impedance Z and quite often known as the power factor.

5 Claims, 9 Drawing Figures

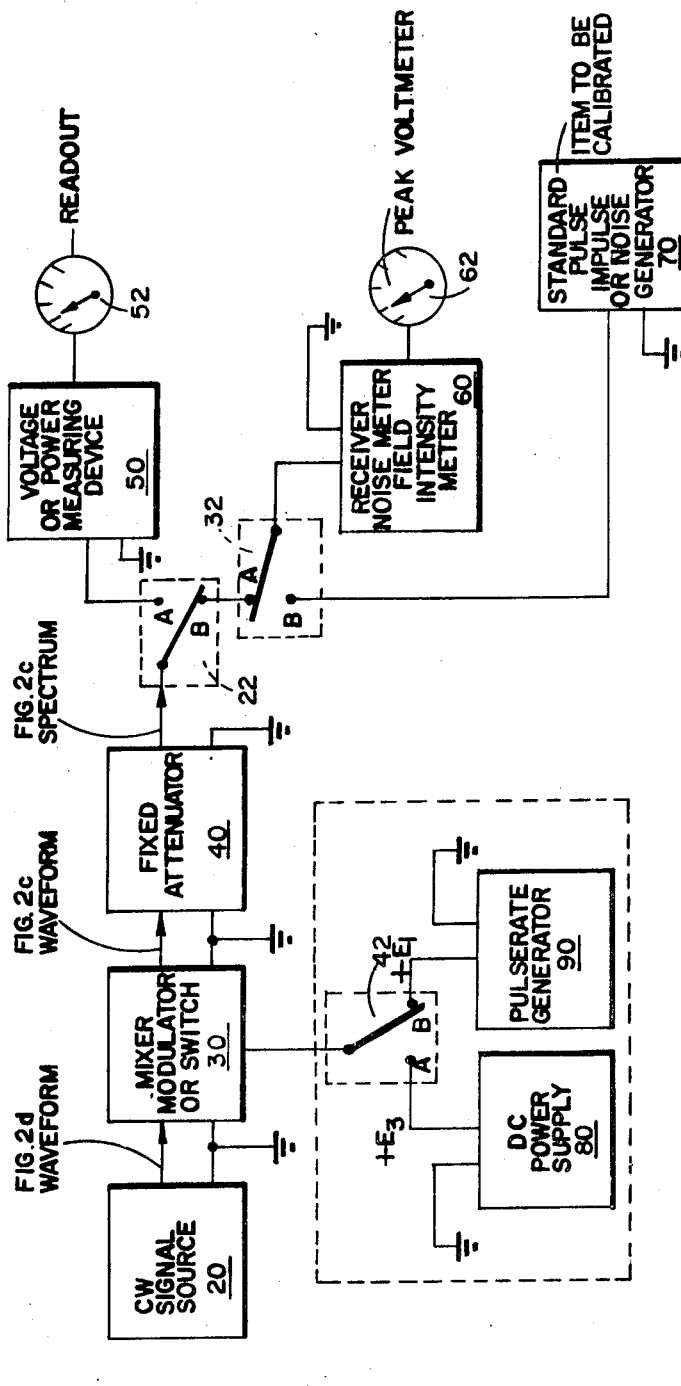

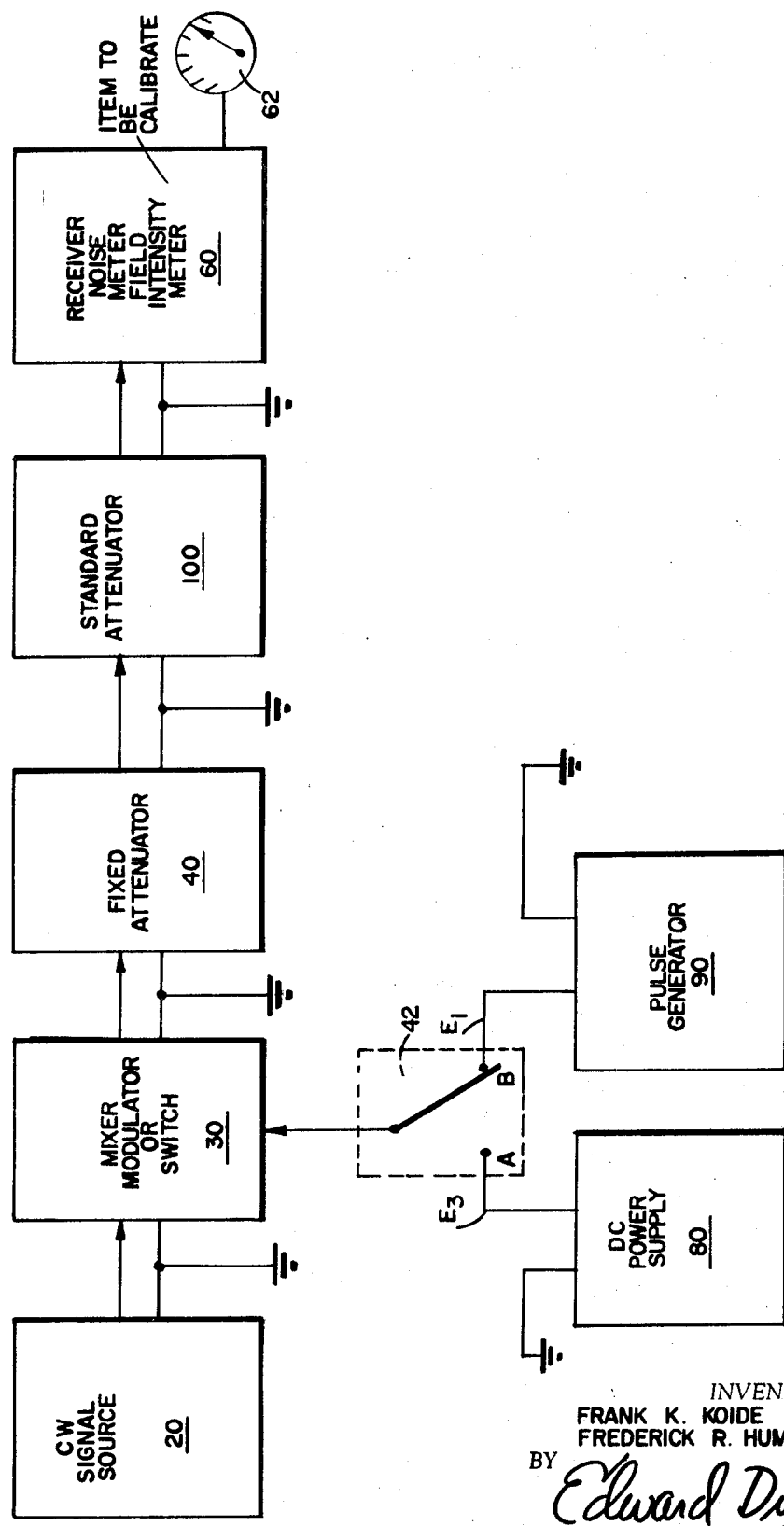

BROADBAND SPECTRAL INTENSITY MEASUREMENT SYSTEM

BACKGROUND OF THE INVENTION

The present invention is directed to an apparatus and method for measuring audio, radio and microwave frequency noise and, more particularly, to an improved impulse/pulse generator and/or broadband spectral intensity calibrator capable of serving as an absolute standard with precision. The invention further relates to the accurate measurement of the impulse bandwidth of manual, semi-automatic, and computer operated electromagnetic interference mesuring instrumentation. These instruments include and are not limited to field intensity meters, receivers, spectrum analyzers which are capable of measuring broadband field strength signals and periodic or non-periodic impulse signals, whether man-made or a natural phenomena. Furthermore, these broadband signals include random noise generators where the noise output is generated by diodes or gas-discharge tubes and similar noise generating devices.

Impulse generators are used for the calibration of the peak or broadband sensitivity of the electromagnetic interference (EMI) field intensity meter. The accuracy of field intensity meters is primarily determined by the accuracy of the impulse generator calibration. In many cases, the impulse generator is an integral part of the field intensity meter. An impulse generator is a device which is capable of producing narrow periodic pulses of such a shape and duration that they contain an energy component known as spectral intensity to very high frequencies. In operation, a d-c voltage is used to charge a calibrated coaxial transmission line. The pulses are produced when the line is discharged in its terminating impedance through mechanically vibrating contacts or avalanched transistors, thus producing characteristics approaching that of an impulse. These mechanical contacts consist of either vibrating diaphragms or, for example, mercury wetted relay switches. By the proper choice of the transmission line length and resistive termination, it is possible to produce periodic transients or impulses having relatively uniform frequency spectrum to a predetermined frequency. Solid-state impulse generators have more recently been designed with some degree of success.

The spectral intensity of an impulse is determined from the pulse area.

$$S = 2A$$

Where $S$ = Spectral Intensity in volts per Hertz bandwidth.

$A$ = Pulse Area, [in volt-seconds.]

Performance of an impulse generator is degraded to some extent by reflections resulting from imperfections in the construction of the transmission line and the output circuit. The performance also degrades as a function of time due to corrosion and electroplating of the contacts on the electromechanical switch which alternately charges and discharges the transmission line. Additional limitations are experienced in the upper frequencies to which an impulse generator can be designed. These factors make the calibration of the spectral intensity output of impulse generators a necessity.

Spectral intensity can be specified in terms of voltage or power. In voltage it can be specified in decibels above 1 microvolt per bandwidth in Hertz. In units of power, it can be specified in terms of decibels above 1 microwatt per bandwidth in Hertz. When abbreviated:
 dB/uV/Bandwidth
 dB/uW/Bandwidth The output spectral intensity specification of most commercially available impulse generators is stated in units of rms microvolts per megacycle or decibels above 1 rms microvolts per megacycle, where the rms is the root-mean-square value.

A prior art system which is most pertinent to this application is U.S. Pat. No. 2,883,616 entitled "Radio Frequency Noise Measurement Systems" by S. Sabaroff. In the referenced patent, the impulse generator to be calibrated feeds a string of pulses having a predetermined pulse rate to a plurality of synchronously tuned shunt circuits. A linear detector detects the envelopes of the pulse wave trains from the circuits and derives therefrom an indication of the average amplitude of the envelopes. Sine-wave signals are fed to each of the synchronously tuned circuits, each having a center frequency corresponding to the center frequency of the circuit. The amplitude of the applied sine-wave signals is controlled so that the peak voltage of the sine-wave signals obtain the same average amplitude as the pulse wave train. The peak voltage of the sine-wave signals is then divided by the repetition rate of the pulse train to provide a measure of the spectral intensity from the impulse generator.

Another prior art system is disclosed in an article entitled "An Impulse Spectral Intensity Measurement System" by R. B. Andrews, Jr., IEEE Transactions on Instrumentation and Measurement, Vol. IM-15, No. 4, December, 1966, pages 299-303. The system described in the article utilizes a commerically available radio interference field intensity meter with an output taken from an IF amplifier in the meter. The input to the meter can be switched between a CW signal generator, the output of which is fed to the meter through a micropotentiometer. The input to the meter can also be attached to the impulse generator to be calibrated. The micro-potentiometer is used to establish the input voltage with the average power output being read with an RF voltmeter and compared against the average power output of the impulse generator. The impulse spectral intensity is then computed using the above derived values.

One of the major limitations of the aforementioned two systems is that in each case it is required that the impulse bandwidth of the receiver be known or that the phase slope of the receiver be linear with frequency. It would, therefore, be highly advantageous to have a system which did not require this special knowledge.

SUMMARY OF THE INVENTION

In one preferred embodiment of the invention for calibrating an impulse or noise generator there is utilized a CW signal source, the output of which is fed to a switching means for connecting and disconnecting the CW signal source to a fixed attenuator. Means are also provided for controlling the switching rate of the switching means. A measuring device is switchably connected to the output of the fixed attenuator to detect the voltage or power of the attenuator's output signal. A receiver means is connected to the attenuator's output or to the output of the impulse or noise generated to be calibrated. In the method of the invention, the item to be measured or calibrated is connected to the input of the receiver means. The receiver is adjusted to the desired calibration frequency and the gain of the receiver is adjusted for a convenient reference indication. The receiver means is the connected to the output of the fixed attenuator. The frequency of the CW signal source is set to correspond to the calibration frequency of the receiver. The output level of the CW signal source is adjusted to duplicate the reference indication established at the receiver means. The switching means is then operated to continually connect the CW signal source to the fixed attenuator and the output of the attenuator is connected to the measuring device to enable the CW power or voltage level to be determined. The spectral intensity of the impulse or noise generator is then calculated using the following equation When using a device calibrated to read the rms voltage, $$S \text{ (volts/Hertz)} = E_{rms} \text{ (volts)} \cdot \tau_{0(seconds)}$$

Where: $S$ is the spectral intensity in rms volts/Hertz of the item to be calibrated.

$E_{rms}$ is the voltage level of the CW signal.

$\tau_0$ is the pulse width of the pulse signal used to modulate the CW signal.

When using a thin film thermoelectric or thermistor mount power measuring device, $$S \text{ (volts/Hertz)} = \left[\sqrt{\frac{P\text{(watts)} \cdot |Z|\text{(ohms)}}{\cos \theta}} \cdot \tau_0 \text{(seconds)}\right]$$

Where: $P$ is the power level of the CW signal.

$|Z|$ is the absolute impedance of the power measuring device.

$\theta$ is the phase angle between the resistive component and the impedance $Z$ and is also known as the power factor.

The fundamental difference between the concept of this invention and the prior art systems is that they required knowledge of the impulse bandwith or required the phase slope of the receiver to be linear with frequency. In this invention, the receiver is only used as an indicator to compare the spectral intensity of the impulse/pulse generator to the spectral intensity of the pulse modulated CW signal. The only requirement of the receiver used as an indicator is that it have sufficient sensitivity and bandwidth to perform the measurement. The spectrum of the impulse/pulse generator is modified by the receiver bandpass in the same manner as the spectrum of the pulse modulated CW signal. The output of the pulse modulated CW signal is adjusted to give the same peak output of the receiver as the impulse generator, and the spectral intensity of the impulse/pulse generator can be determined from the amplitude and pulse width of the CW signal.

It is, therefore, an object of the present invention to provide an improved method and means for accurately measuring or calibrating the spectral intensity output of an impulse or pulse generator.

It is another object of the present invention to provide an improved method and means for accurately determining the impulse bandwidth of electromagnetic interference instruments.

The aforementioned and other objects of the present invention will become more apparent and better understood when taken in conjunction with the following description and drawings, throughout which like characters indicate like parts and which drawings form a part of this application.

BRIEF DESCRIPTION OF THE DRAWINGS

FIG. 1 is a block schematic diagram of the preferred embodiment of the invention;

FIG. 3 illustrates in block diagram form a second embodiment of the invention.

DESCRIPTION OF THE PREFERRED EMBODIMENTS

Figure 2A:
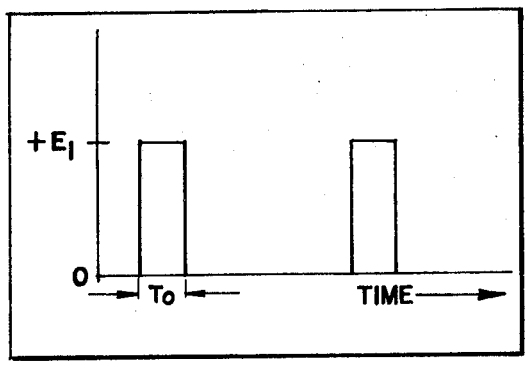
FIGS. 2a to 2f are waveforms taken at various points in the embodiment of FIG. 1.
Figure 2B:
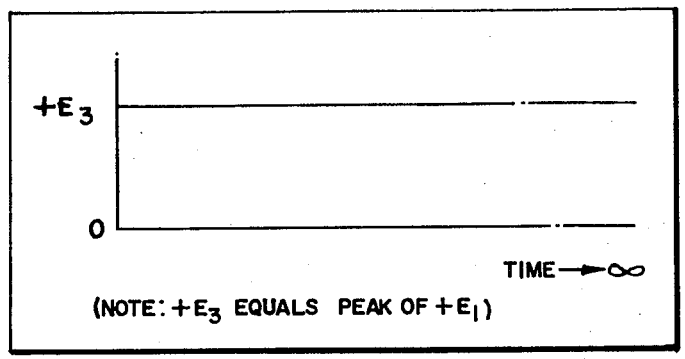
Figure 2C:
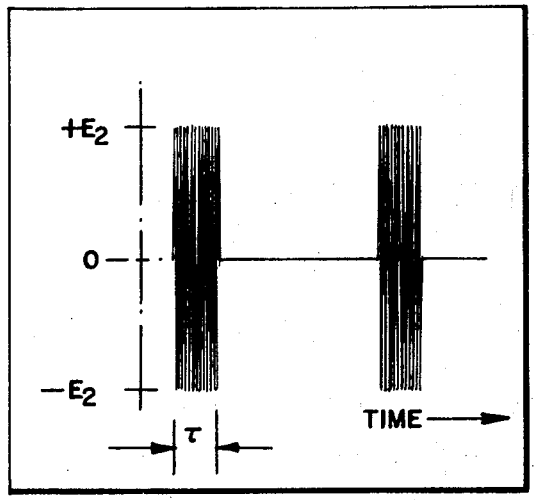
Figure 2D:
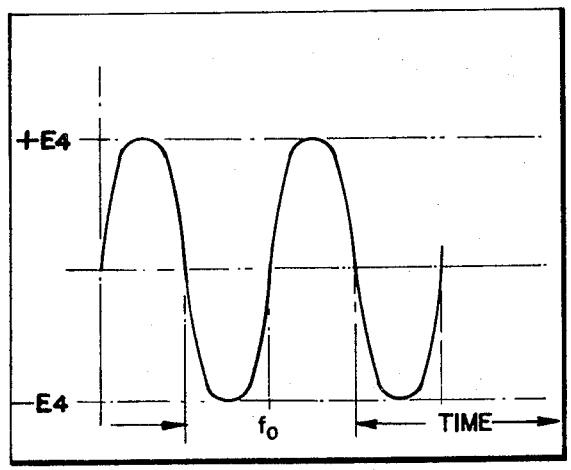

Referring now to FIG. 1, a CW signal source 20 provides an output signal as shown in FIG. 2d which has an adjustable output amplitude and frequency. The frequency is set to the desired calibration frequency for the impulse/pulse generator 70 under calibration. The mixer modulator 30 receives the output from the CW signal source 20. The modulator 30 is used to simulate a signal throw switch in alternately connecting and disconnecting the signal source 20 to the fixed attenuator 40 when turned on or off under control of pulse rate generator 90. The critical operating specifications for the modulator are insertion loss, on-off ratio, rise-time, fall-time, and switching speed.

The modulator 30 must be capable of being rurned on for very short periods of time by the pulse rate generator 90 which is connected to the modulator when the switch 42 is placed in the B position. The modulator must also be capable of being held on continuously when it is connected to the d-c power supply 80 by switch 42 when the switch is in the A position The output signal, a pulsed modulator drive signal, generated by the pulse rate generator 90 is shown in FIG. 2a and has a peak value as shown at $E_1$.

The output of the d-c power supply, a steady modulator drive signal, designated $+E_3$ is illustrated in FIG. 2b. A device suitable for use as the mixer modulator 30 in the present invention is manufactured by Relcom Company, Mountain View, California. The fixed attenuator 40 is used to provide a good impedance match to the voltage or power measuring device 50 when the switch 22 is in the A position. Switch 22 is a single pole, double-throw, coaxial switch which is used to alternately connect the output of the fixed attenuator 40 to the voltage or power measuring device 50 and the receiver noise meter field intensity meter 60 by means of a second coaxial switch 32 when switch 32 is in the A position. Switch 32 is a single pole double-throw switch which alternately connects the input of the receiver 60 to the impulse generator 70 when the switch is in the B position or to the fixed attenuator 40. The voltage or power device 50 and the readout device 52 are used to measure the CW rms amplitude of the output of attenuator 40. The voltage or power device 50 can be any voltage or power measuring device capable of covering the required frequency range and measuring the required amplitudes. Items such as thermistor mountpower meters, thin film thermoelectric power heads, micropotentiometers, thermal voltage converters, high frequency voltmeters and semiconductor diodes can be used satisfactorily for this purpose. The receiver 60 is used as a reference level indicator. The device should have sufficient sensitivity to indicate when the impulse generator 70 has a spectral intensity output equal to the spectral intensity at the output of the fixed attenuator 40. The d-c power supply 80 must be capable of providing a voltage which is equal to the peak voltage output of the pulse generator 90 (e.g. $E_3$ = peak $E_1$). The exact level required is dependent upon the operational requirements of mixer 30. The pulse rate generator 90 must be capable of generating a pulse width signal having a pulse width $\tau_o$ which can accurately be determined in order that the spectral intensity may be calculated from there. The item to be calibrated 70 may be a pulse generator, impulse generator, noise generator or any other source of broadband energy and for purposes of this particular disclosure will be called a pulse generator. The peak voltmeter 62 which generally is an integral part of the receiver 60 provides the voltage level of the signal received at its input. The readout 52 provides an indication of the voltage or power output from the measuring device 50.

Figure 2E:
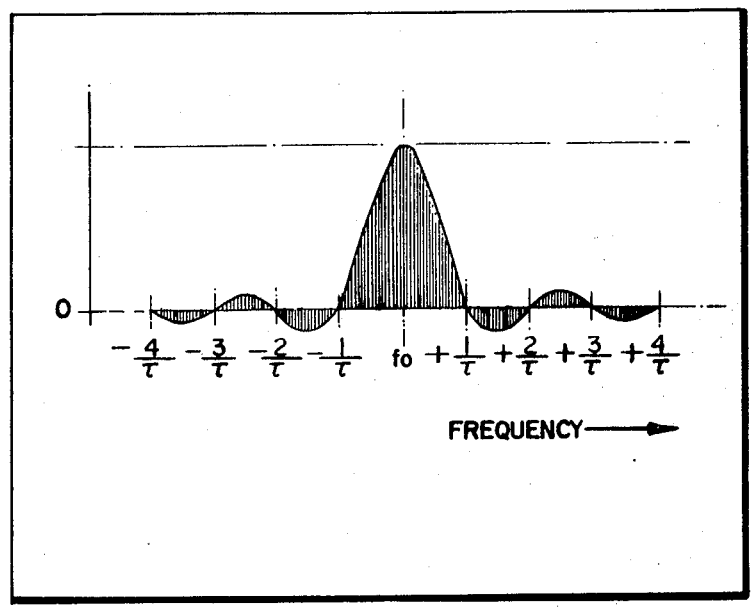
Figure 2F:
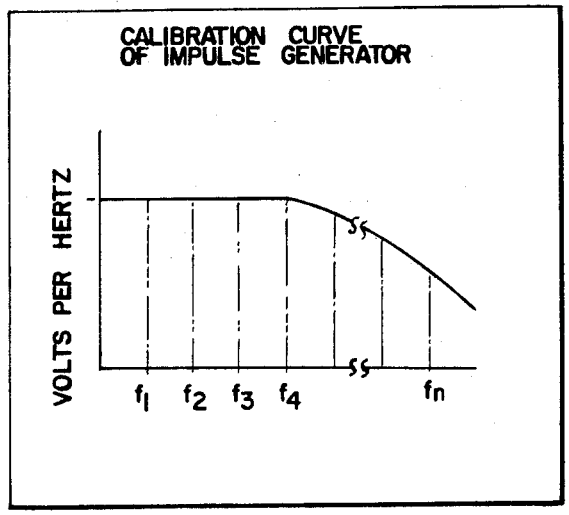

The output waveform from the mixer modulator 30 is illustrated in FIG. 2e. The spectrum of the signal from the fixed attenuator 40 is shown in FIG. 2e and the calibration curve of the impulse generator 70 is shown in FIG. 2f.

In operation, the impulse generator 70 to be measured or calibrated is connected to the input of the receiver 60 by means of switch 32 being placed in the B position. The receiver 60 is adjusted to the desired calibration frequency $f_1$ and the gain of the receiver is adjusted for a convenient reference indication on the peak voltmeter 62. The receiver 60 is then connected to the output of the fixed attenuator 40 by placing switch 32 in position A and switch 22 in position B. The frequency of the signal source 20 is set to correspond to the calibration frequency of the receiver 60. The pulse rate generator 90 is connected to the mixer modulator 30 to provide a pulsed modulator drive signal by means of placing switch 42 into position B. The output level of the CW signal from the adjustable output amplitude signal source 20 is adjusted to duplicate the reference indication established on the receiver peak voltmeter 62. Switch 42 is then placed in the A position and a continuous d-c modulator drive voltage is then supplied to the mixer modulator from the d-c power supply 80. The output of the attenuator 40 is then connected to the input of the power measuring device 50 by placing switch 22 into position A. The CW power level is then measured by means of readout meter 52. The spectral intensity output of the impulse generator 70 is then calculated using the following equation:

$$S = \sqrt{\frac{P|Z|}{\cos\theta}} \cdot \tau_o \qquad \text{(Eq. 1)}$$

where $S$ = Spectral Intensity in rms volts per Hertz
$P$ = power level of the CW signal measured at meter 52
$\tau_o$ = pulse width of the pulse generator
$|Z|$ = the absolute impedance of the power measuring device $\theta$ = the phase angle between the resistive component and the impedance Z.

The entire calibration process is then repeated for each desired calibration frequency of the impulse generator 70. The final calibration then results in a calibration curve such as that shown in FIG. 2f.

The impulse bandwidth of a field intensity meter (FIM) or receiver can then be determined from the following:

$$S = E \cdot \tau_o \qquad \text{(Eq. 2)}$$

where $E$ is the voltage indication of meter 62 at the output of the receiver means when the mixer modulator 30 is fed with a steady modulator drive signal from the d-c power supply 80.

$\tau_o$ is the pulse width in seconds supplied by the pulse rate generator 90

$S$ is the spectral intensity in Volts/Hertz. Since the impulse bandwidth is proportional to the level of the spectral intensity, the following equation can be given as:

$$E_r = S\, I_{BW} \qquad \text{(Eq. 3)}$$

where $E_r$ is the voltage indication of the meter 62 at the receiver to be calibrated or measured; and when the mixer modulator is pulsed-on by the pulsed modulator drive signal from pulse rate generator 90.

$I_{BW}$ is the impulse bandwidth to be measured or calibrated.

$$I_{BW} = E_r \text{ (volts)}/E \text{ (volts)} \cdot 1/\tau_o \text{ (seconds)} \qquad \text{(Eq. 4)}$$

$E_r/E$ is a ratio which can be measured by noting the change in the amplitude $E_r$ of peak voltmeter 62, the unit to be calibrated or measured when the mixer modulator 30 is initially turned-on by the d-c power supply 80 and pulsed-on by the rate generator 90. In practice, the impulse bandwidth $I_{BW}$ can be measured by the change in attenuation in decibels (dB) and then converted to a voltage ratio for solution of equation 4.

An alternate method in measuring or calibrating the impulse bandwidth $I_{BW}$ is by adjusting $\tau_o$, the pulse width of the pulse rate generator 90 to obtain a given $E_r/E$ ratio.

Figure 4:
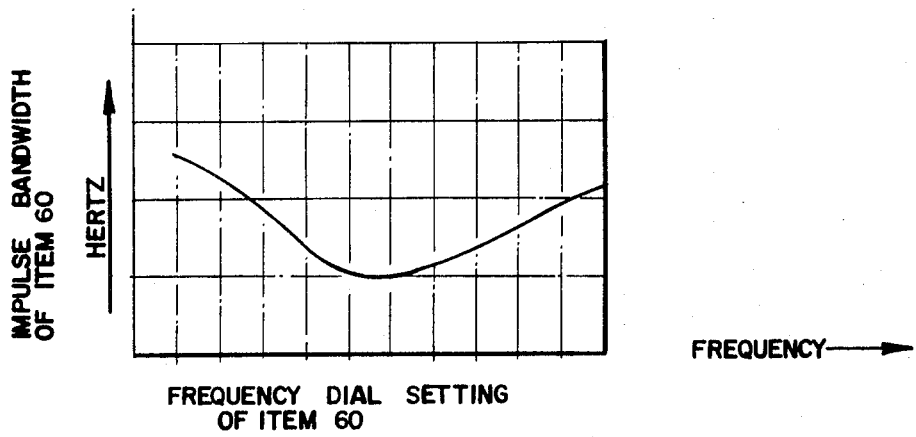
FIG. 4 illustrates in a graphic form the determined impulse bandwidth utilizing the embodiment of FIG. 3.

Referring now to FIG. 4 wherein is disclosed a system for measuring the impulse bandwidth of a receiver. Items 20, 30, 40, 60, 80, 90 and 42 are identical to those items described in connection with FIG. 1. The one additional item is a standard variable attenuator 100 which receives the output of the fixed attenuator 40 and feeds that output after modification to the receiver 60. Receiver 60, as previously stated, may be a noise meter, field intensity meter, receiver, spectrum analyzer etc. The standard variable attenuator 100 is a calibrated item where the attenuation is known to a predetermined value with a high degree of accuracy. This item can be continuously variable or stepped in small and large increments of attenuation. In operation, the CW signal source 20 is adjusted to the first calibration frequency $f_1$. The mixer modulator 30 is turned on by placing switch 42 in the A position. The unit to be calibrated 60 is adjusted or tuned to the calibration frequency $f_1$. The gain of the calibrated device, the output level of CW signal source 20 and the attenuation of attenuator 100 are adjusted for a reference indication on the peak voltmeter and the attenuator setting of attenuator 100 is noted. The reference indication is determined mainly from prior knowledge of the nominal input impulse bandwidth of the receiver 60 and the attenuation range of the receiver 60 and the variable attenuator 100. The switch 42 is then placed in the B position to connect the pulse rate generator to the modulator 30. The standard variable attenuator 100 is decreased until the reference indication on the peak voltmeter 62 is identical to the prior reading. The attenuator setting which accomplishes this particular match is then noted. The difference in attenuation is then converted to a voltage ratio:

$$(E_r/E) = \text{Antilog } (-dB)/20$$

OR (Eq. 5)

$$(E_r/E) = 10^{-(dB)/20}$$

The impulse bandwidth $I_{bw}$ is calculated by using equation 4. The measurement process is then repeated for the remaining frequencies $f_2, f_3, f_4 \ldots f_m$.

While there has been shown what is considered to be the preferred embodiments and methods of the preferred invention, it will be manifest that many changes and modifications may be made therein without departing from the essential spirit of the invention. It is intended, therefore, in the annexed claims, to cover all such changes and modifications as fall within the true scope of the invention.

We claim:

1. A calibration system comprising in combination:
   a. a reference level indicator means tunable to desired calibration frequencies for providing an indication of the level of an input signal;
   b. a variable CW signal tunable to desired calibration frequencies;
   c. a modulator means receiving the output CW signal from said source for modulating said CW signal in accordance with modulator drive signals;
   d. a pulse rate generator for generating a train of pulses having an accurately known pulse width;
   e. a d-c power supply;
   f. first switching means for alternately connecting said modulator means to said pulse rate generator and said d-c power supply to provide said modulator means with said drive signals;
   g. measuring means for measuring voltage or power; and
   h. second switching means for alternately connecting said reference level indicator means to a broadband spectral intensity signal source that is to be calibrated, and to said modulator means, and for alternately connecting said modulator means to said means for measuring voltage or power and said reference level indicator means.

2. The method of calibrating a standard impulse generator comprising the steps of:
   a. connecting the output of said impulse generator to a receiver tuned to a first calibration frequency and noting a reference indication of the signal received from the impulse generator;
   b. connecting the input of the receiver to a CW signal source tuned to the first calibration frequency;
   c. modulating the CW signal source with a train of pulses having a known pulse width;
   d. adjusting the output level of the CW signal source to provide a reference indication at the receiver identical to the reference indication noted in step (a);
   e. modulating the CW signal source with a d-c modulator drive signal having a level identical to the peak level of the pulses used in step (c);
   f. measuring the power level of the CW signal provided in step (e);
   g. computing the spectral intensity of the impulse generator using the following formula:

$$S = \left[ \sqrt{\frac{P|Z|}{\cos \theta}} \cdot \tau_o \right]$$

where: S is the spectral intensity in rms volts/Hertz
P is the power level measured in step (f)
$|Z|$ is the absolute impedance of the device used to measure the power level in step (f)
$\tau_o$ is the pulse width of pulse signal used to modulate the CW signal
$\theta$ is the phase angle between the resistive component and the impedance Z;
   h. repeating the steps (a) through (g) for each calibration frequency.

3. In a system for the calibration of an impulse generator and the like the combination comprising:
   a. a receiver means tunable to a group of individual calibration frequencies connectable to the impulse generator under calibration to provide an indication of the level of the signal from the impulse generator at each of the calibration frequencies;
   b. a CW signal source tunable to the same group of individual calibration frequencies as said receiver means;
   c. means for modulating said CW signal source with a pulse signal to provide a pulse modulated signal to said receiver;
   d. means for providing a CW signal at the output of said modulating means by connecting a d-c voltage source to said modulating means in place of said pulse signal, the level of said d-c voltage source being identical to the peak level of said pulse signal;
   e. means for measuring the power level of said CW signal at each of said individual calibration frequencies to determine the spectral intensity of the impulse generator.

4. In a calibration system, the combination comprising:
   a. a receiver means tunable to a group of individual calibration frequencies;
   b. a variable attenuator means connected to the input of said receiver means;
   c. a fixed attenuator connected to the input of said variable attenuator means;
   d. a CW signal source tunable to the same group of individual calibration frequencies as said receiver means;
   e. means for modulating said CW signal source with a pulse signal to provide a pulse modulated CW signal to said receiver;
   f. means for providing a CW signal at the output of said modulation means by connecting a d-c voltage source to said modulation means in place of said pulse signal, the level of said d-c voltage source being identical to the peak level of said pulse signal.

5. The method of calibrating a standard impulse generator as set forth in claim 2 wherein step (g) is computing the spectral intensity of the impulse generator using the following formula:

$$S = E_{rms} \tau_o$$

$E$ is the rms voltage level of step (f); and
$\tau_o$ is the pulse width of pulse signal used to modulate the CW signal.

* * * * *